United States Patent [19]

Kamiyama et al.

[11] Patent Number: 5,566,719
[45] Date of Patent: Oct. 22, 1996

[54] METHOD FOR LINING A BRANCH PIPE OF AN UNDERGROUND PIPE

[75] Inventors: Takao Kamiyama, Hiratsuka; Yasuhiro Yokoshima, Ibaraki-ken, both of Japan

[73] Assignees: Shonan Gosei-jushi Seisakusho K.K., Kanagawa-ken; Yokoshima & Company, Ibaraki-ken, both of Japan

[21] Appl. No.: 398,241

[22] Filed: Mar. 3, 1995

[30] Foreign Application Priority Data

Jul. 5, 1994 [JP] Japan .................................. 6-153383

[51] Int. Cl.⁶ ............................................ F16L 55/16
[52] U.S. Cl. .............................. 138/98; 138/97; 156/287
[58] Field of Search ................. 138/97, 98; 405/150.1; 156/287; 264/267; 29/402.09

[56] References Cited

U.S. PATENT DOCUMENTS

| | | | |
|---|---|---|---|
| 4,368,091 | 1/1983 | Ontsuga et al. | 156/287 |
| 4,581,085 | 4/1986 | Wood | 138/97 X |
| 4,714,095 | 12/1987 | Muller et al. | 138/98 |
| 4,724,108 | 2/1988 | Jurgenlohmann et al. | 138/98 X |
| 4,752,511 | 6/1988 | Driver | 138/98 X |
| 4,758,454 | 7/1988 | Wood | 138/98 X |
| 4,836,715 | 6/1989 | Wood | 138/98 X |
| 4,893,389 | 1/1990 | Allen et al. | 138/98 X |
| 5,329,063 | 7/1994 | Endoh | 138/98 |
| 5,439,033 | 8/1995 | Kamiyama et al. | 138/98 |

FOREIGN PATENT DOCUMENTS 60-242038  12/1985  Japan .

Primary Examiner—David Scherbel
Assistant Examiner—Patrick F. Brinson
Attorney, Agent, or Firm—Lowe, Price, LeBlanc & Becker

[57] ABSTRACT

A method is proposed for lining a branch pipe from the main pipe; in particular a special sealing mechanism is adopted in attaching the collar of a liner bag onto the flange of a fluid pressure sealing nozzle: stopper tacks are embedded in the collar at appropriate locations, each of the stopper tacks having its bottom end exposed from the back face of the collar and connected with a string; the back face of the collar of the branch pipe liner bag is faced with the upper face of the flange of the fluid pressure sealing nozzle, which comprises a hollow cylindrical part, the flange extending perpendicularly from the side of the cylindrical part, at least one endless sealant laid on the upper face of the flange, and a string puller provided in the flange; the strings are engaged with the string puller; the string puller pulls the strings so that the collar and the flange are moved toward each other until sufficient sealing effect is obtained.

4 Claims, 11 Drawing Sheets

METHOD FOR LINING A BRANCH PIPE OF AN UNDERGROUND PIPE

BACKGROUND OF THE INVENTION

1. (Field of the Invention)

The present invention relates to a method for lining a branch pipe of an underground main pipe by applying a lining material on the inner wall of the branch pipe.

2. (Description of the Prior Art)

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid or by an inflatable pressure bag, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

This method in principle applicable to a pipe branching out from a main pipe as well, and an example of how it is conducted will be described next with reference to FIG. 8.

FIG. 8 is a vertical sectional view of a sewerage site, showing the conventional method of lining a pipe 102 branching out from a main pipe 101. The reference numeral 116 designates a rigid everter introduced and positioned in the main pipe 101 in a manner such that the eversion end of it peeps up the branch pipe 102, and it is closed at the other end, the right end as viewed in FIG. 8, and contains in it an inflatable pressure bag 140 and a tubular branch pipe liner 104 trimmed to a length corresponding to that of the branch pipe 102. While packed in the everter 116, the liner 104 is within the pressure bag 140, which is for pressing the liner 104 against the inner wall of the branch pipe, the liner 104 comes outside the pressure bag 140 when everted out from the everter 116, as shown in FIG. 8. The branch pipe liner 104 must be detached from the everter 116 so that it is necessary to anchor the inflatable pressure bag 140 to the open end of the everter 116.

When pressurized air or liquid is supplied to the everter 116, the pressure bag 140 together with the branch pipe liner 104 is everted into the branch pipe 102, and while keeping the pressure bag 140 inflated, the tubular branch pipe liner 104 is heated to cure the hardenable liquid resin impregnated in it, whereupon the liner 104 becomes rigid. Then, the pressure bag 140 is removed from the branch pipe 102 (branch pipe liner 104) to leave the branch pipe 102 neatly lined with the hardened branch pipe liner 104 to complete the repair.

However, in the above method, the pressure bag 140 had to be replaced with one of a different length each time the branch pipe of a different length was repaired, and this necessitated the tiresome labor of changing the pressure bags 140.

Thus, an improved branch pipe lining method was proposed which will next be explained with reference to FIGS. 9 through 11.

FIGS. 9 through 11 are cross-sectional views to show the conventional branch pipe lining method in order of the operation. According to this method, an everter 216 and a branch pipe liner bag 204 are hermetically connected to each other via a fluid pressure sealing nozzle 207, as shown in FIG. 9, and the hermetical connection of the fluid pressure sealing nozzle 207 with the collar 204A of the branch pipe liner bag 204 is attained by means of any of the mechanical seal assemblies (a) through (d) illustrated in FIG. 12.

We will briefly explain each of the mechanical seal assemblies (a) through (d) with reference to FIG. 12.

The mechanical seal assembly (a) in FIG. 12 has a tapered railing 207a extending from the fluid pressure sealing nozzle 207, and by virtue of this railing 207a the fluid pressure sealing nozzle 207 is connected hermetically to the branch pipe liner bag 204.

The mechanical seal assembly (b) of FIG. 12 employs an O ring 230 buried in the flange of the fluid pressure sealing nozzle 207, while the mechanical seal assembly (c) of FIG. 12 employs a valve 231 provided on the fluid pressure sealing nozzle 207 to attain hermetic sealing at the joint of the fluid pressure sealing nozzle 207 with the branch pipe liner bag 204.

In the case of the mechanical seal assembly (d) of FIG. 12, the collar 204A of the branch pipe liner bag 204 is inlaid with magnet plates 232, and these are attracted by the magnet blocks 233 provided on the lower face of the flange portion of the fluid pressure sealing nozzle 207 whereby the collar 204A is firmly held on the fluid pressure sealing nozzle 207 to hermetically close the space between the nozzle 207 and the branch pipe liner 204.

Thus, as shown in FIG. 9, the collar 204A of the branch pipe liner bag 204 packed in the everter 216 is placed on the fluid pressure sealing nozzle 207, and by employing an on-the-sleigh robot 203 the fluid pressure sealing nozzle 207 is pushed upward to thereby press the collar 204A of the branch pipe liner bag 204 against the inner wall of the main pipe 201 so that the collar 204A is anchored at the entrance of the branch pipe 202. Then, a compressor 219 is started to supply compressed air to the everter 216 by way of an air hose 218, whereupon the branch pipe liner bag 204 is urged by the pressure of the compressed air to evert into the branch pipe 202, running upward from the main pipe 201 to the surface of the ground.

When the entire length of the branch pipe liner bag 204 is everted and penetrates the branch pipe 202, the closed end of the branch pipe liner bag 204 is cut open and a pressure cup 250, as shown in FIG. 10, is connected to the upper end of the branch pipe liner 204 to close the opening. A hot water hose 221 and an air hose 222 are provided to penetrate this cup 250. Hot water and compressed air are supplied into the branch pipe liner 204 by way of a hot water hose 221 and an air hose 222, respectively.

Then, the branch pipe liner bag 204 is inflated and pressed against the inner wall of the branch pipe 202 by the pressure of the compressed air, as shown; and at the same time, the thermosetting liquid resin impregnated in the branch pipe liner bag is heated by the hot water and as it cures the branch pipe liner bag becomes hard and rigid.

That part of the branch pipe liner 204 which extends outside the branch pipe 202 is cut off, and consequently, the inner wall of the branch pipe 202 is closely lined with the branch pipe liner 204.

After the branch pipe liner 204 is hardened, the on-the-sleigh robot 203 is driven to lower its piston rod and is pulled back by a pull rope 208, whereupon the fluid pressure sealing nozzle 207 is easily detached off the collar 204A of the branch pipe liner 204, as shown in FIG. 11.

As the on-the-sleigh robot 203 is drawn back by the pull rope 208 rghtward, as seen in FIG. 11, the fluid pressure sealing nozzle 207 and the everter 216 are all together pulled in the same direction and removed from the main pipe 101. Thus, the hardened branch pipe liner 204 alone is left in the branch pipe 202, and the lining operation of the branch pipe 202 is completed.

According to the invention, therefore, the pressure bag 140 of FIG. 8 can be dispensed with, and thus it is not necessary to replace the pressure bag 140 each time a branch pipe of different length is lined.

(Problems the Invention seeks to solve)

However, although high sealing effect is required at the juncture between the branch pipe liner bag 204 and the fluid pressure sealing nozzle 207, none of the mechanical seal assemblies (a) through (d) of FIG. 12 employed in the conventional branch pipe lining method has proved satisfactory.

Therefore, it is an object of the invention to provide a branch pipe lining method in which it is possible to effect a highly hermetic junction between the branch pipe liner bag and the fluid pressure sealing nozzle by means of a simple construction, and it is also possible to conduct a highly smooth eversion of the branch pipe liner bag into the branch pipe.

Generally, an access space to a branch pipe is about 400 mm in diameter, and is not as wide as the main pipe manhole which usually has a diameter of 900 mm, so that it was impossible for a man to do manual operations inside the access space, and it was necessary to evert the branch pipe liner bag as high as the position where a man could reach the bag by hand. For this reason, as shown in FIG. 10, the branch pipe liner bag 204 was everted until it rose up to the surface of the ground, and a pressure cup 250 was connected to the upper end of the branch pipe liner 204, and a hot water hose 221 and an air hose 222 were provided to penetrate this pressure cup 250. This necessitated troublesome operations, and inasmuch as that part of the branch pipe liner 204 which protrudes beyond the upper end of the branch pipe 202 was wasted, this procedure was not economical.

Therefore, it is another object of the invention to provide a branch pipe lining method which is improved such that the operation is much simpler and the wasted part of the branch pipe liner is substantially reduced, so that the operation is greatly economized.

(Means to solve the Problems)

In order to solve the above problems and others, there is proposed a method for lining a branch pipe of an underground main pipe comprising the steps of: (a) preparing a tubular liner bag made of a nonwoven fabric soaked with a hardenable liquid resin, one end of said tubular liner bag being closed; (b) turning outwardly the open end of said tubular liner bag to form a collar which is so curled as to have a curvature equal to that of the inner wall of the main pipe; (c) curing the liquid resin in said collar to thereby harden the collar; (d) embedding stopper tacks in said collar at appropriate locations, each of said stopper tacks having its bottom end exposed from the back face of said collar and connected with a string; (e) facing the back face of the collar of the branch pipe liner bag with the upper face of a flange of a fluid pressure sealing nozzle, which comprises a hollow cylindrical part, through which the liner bag is passed, the flange extending perpendicularly from the side of said cylindrical part, at least one endless sealant laid on the upper face of said flange, and a string pull means provided in said flange; (f) engaging said strings with said string pull means of the flange; (g) causing said string pull means to pull said strings so that the collar and the flange are moved toward each other until sufficient sealing effect is obtained at the juncture between the collar and the flange by means of the endless sealant; (h) packing that portion of said liner bag which is tailing out from the fluid pressure sealing nozzle in an everter, which is a tubular body with one end closed; (i) connecting the open end of said everter with the bottom end of the cylinder part of the fluid pressure sealing nozzle in a manner such a closed space is defined by the inner wall of the everter, the inner wall of said cylindrical part and the outer surface of the uneverted part of the liner bag; (j) positioning said fluid pressure sealing nozzle together with the everter at the opening of the branch pipe in the main pipe such that the collar is fitted on the inner wall of the main pipe around the opening of the branch pipe; (k) everting said branch pipe liner bag into the branch pipe from the fluid pressure sealing nozzle toward the surface of the ground by supplying pressurized fluid into said closed space from the closed end of the everter; (l) hardening said hardenable liquid resin impregnated in the branch pipe liner bag while keeping the liner bag inflated by means of the fluid pressure; (m) severing said strings and detaching the fluid pressure sealing nozzle from the collar of the branch pipe liner bag; and (n) cutting off that portion of said liner bag which protrudes outside the branch pipe.

In a preferable embodiment, the method is characterized in that at the step (d) above said string is each provided with a hook tied at the free end; and at the step (e) said string pull means comprises a plurality of internally threaded sleeves extending perpendicularly downward from the lower face of the flange, the sleeves being arranged at locations which coincide with said stopper tacks of said collar, each one of said sleeves containing a bolt screwed upwardly in it, each one of said screws having a freely rotatable catch means at its tail end; and at the step (f) said hooks are engaged with the respective catches of said bolts; and at the step (g) said bolts are turned in the direction to pull said strings into said sleeves so that the collar and the flange are moved toward each other.

In a more preferred embodiment of the invention, the method is characterized in that at the step (e) above said fluid pressure sealing nozzle further comprises an electric heater provided at each one of said threaded sleeves, and at the step (m) said strings are severed by being heated by said electric heaters.

In another embodiment of the invention, the method is characterized in that said hardenable liquid resin is a thermosetting resin and at the step (1) above said hardening is effected by supplying hot liquid through a pipe which is stabbed into the upper end portion of the everted branch pipe liner bag, and similarly said fluid pressure to keep the liner bag inflated is supplied through another pipe which is also stabbed into the upper end portion of the liner bag.

(Effects of the Invention)

According to the method of the present invention, the collar of the branch pipe liner bag is pressed on the endless sealant laid on the flange of the fluid pressure sealing nozzle as it is pulled by the strings, so that it is possible to effect a highly hermetic junction between the collar of the branch pipe liner bag and the flange of the fluid pressure sealing nozzle by means of the simple construction, and thus it is also possible to conduct a leakless eversion of the branch pipe liner bag into the branch pipe.

Also, after the branch pipe liner bag inserted into the branch pipe by eversion is hardened, one has only to server the strings by electric heaters, etc. in order to detach the fluid pressure sealing nozzle from the branch pipe liner bag, so that scarce labor is required at this time.

Furthermore, since lengthy pipes are stabbed into the upper end of the everted branch pipe liner bag in order to supply hot liquid and fluid pressure to effect hardening of the branch pipe liner bag while it is kept inflated, there is no need of everting the branch pipe liner bag as high as the position where a man could reach the bag by hand, nor is it necessary to attach a pressure cup at the upper end of the everted liner bag. Therefore, the operation is much simplified and the wasted part of the branch pipe liner is substantially reduced, and a economical operation can be achieved.

The above and other objects and features of the invention will appear more fully hereinafter in the following description given in connection with the accompanying drawings and the novelty thereof pointed out in the appended claims.

(Embodiments)

Next, an embodiment of the invention will be described with reference to the attached drawings.

Figure 1:
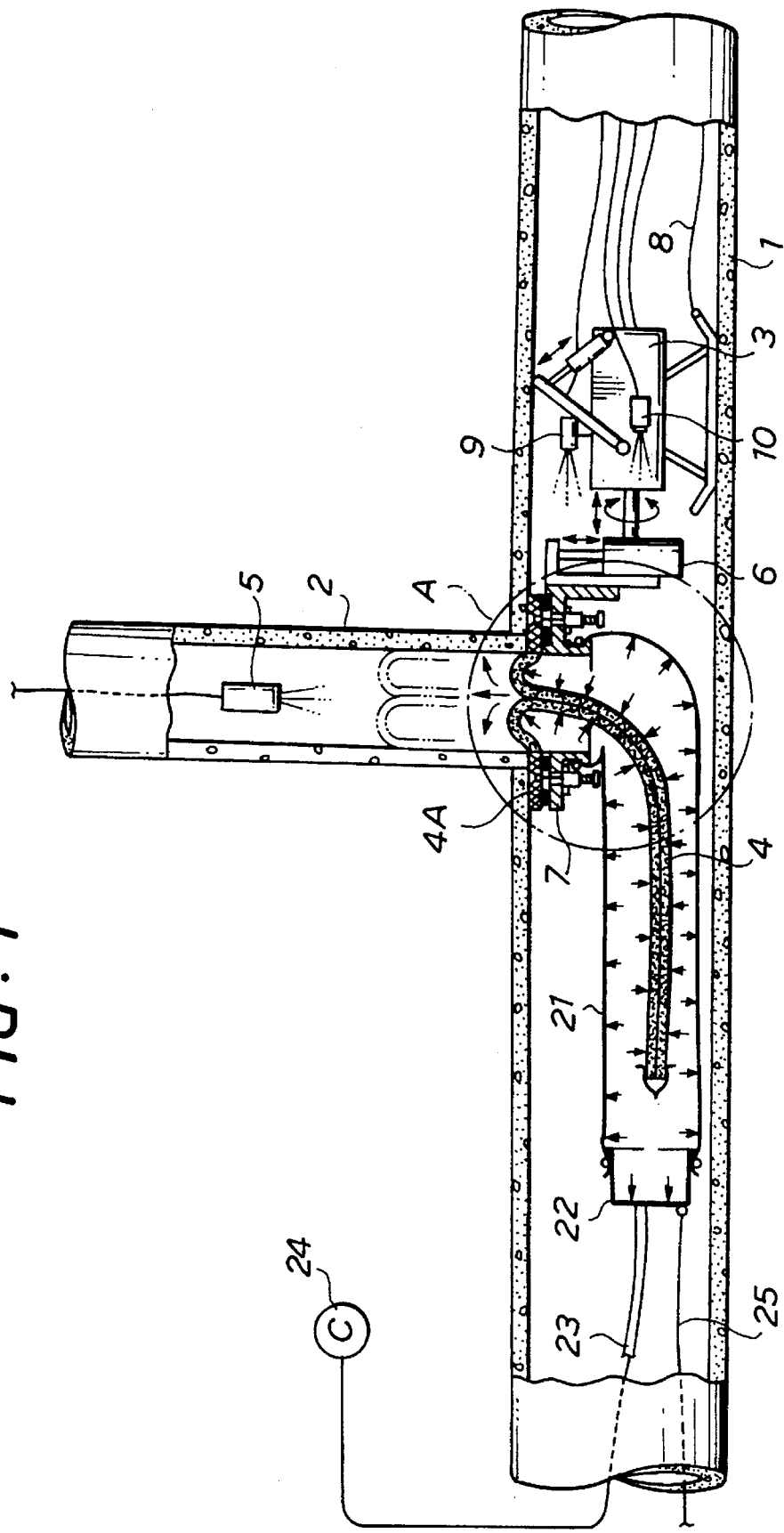
FIG. 1 is a sectional side view of a branched main pipe, illustrating a step of the branch pipe lining method of the invention.
Figure 2:
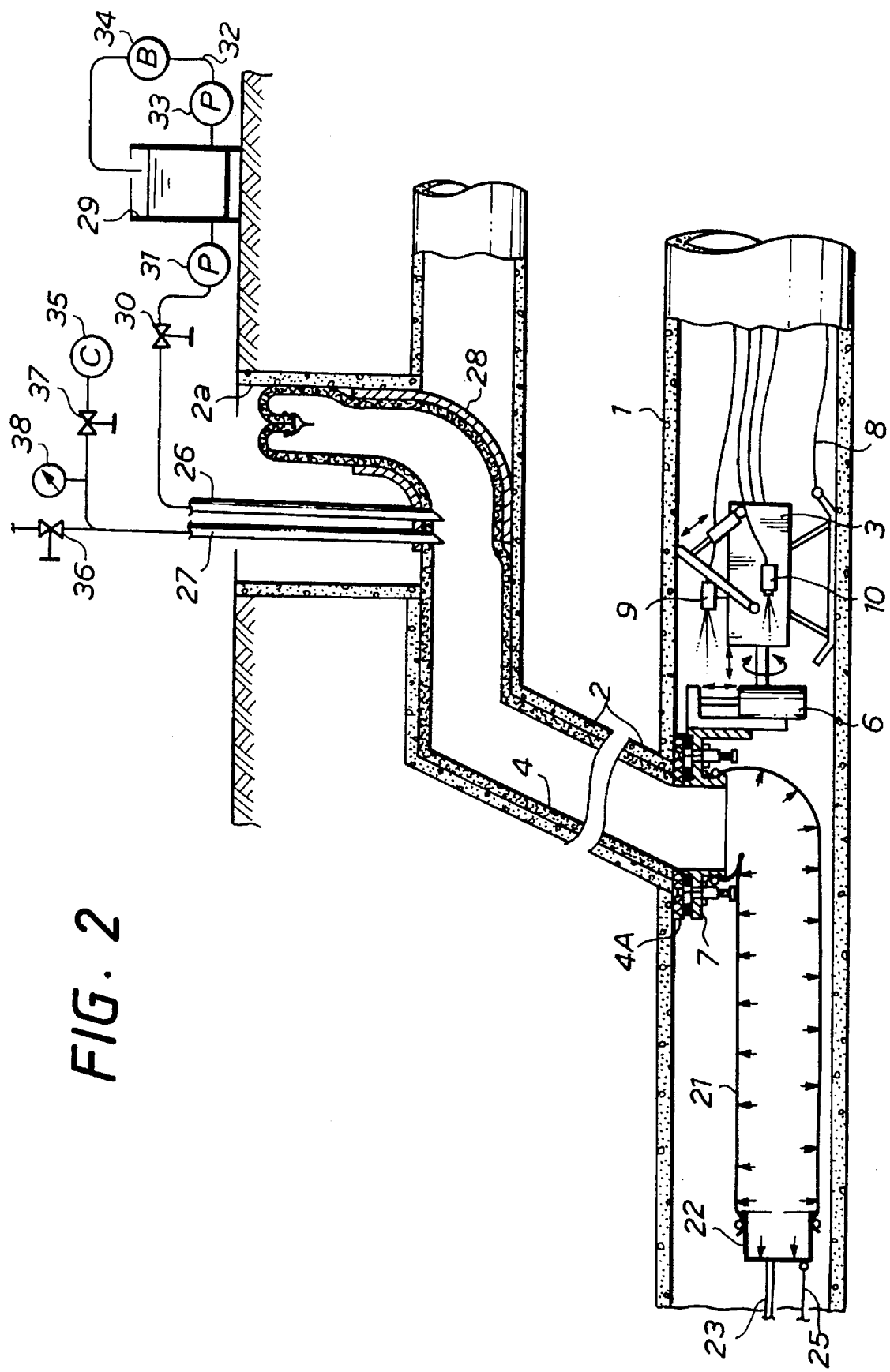
FIG. 2 is a sectional side view of the branched main pipe, illustrating another step of the branch pipe lining method of the invention.
Figure 3:
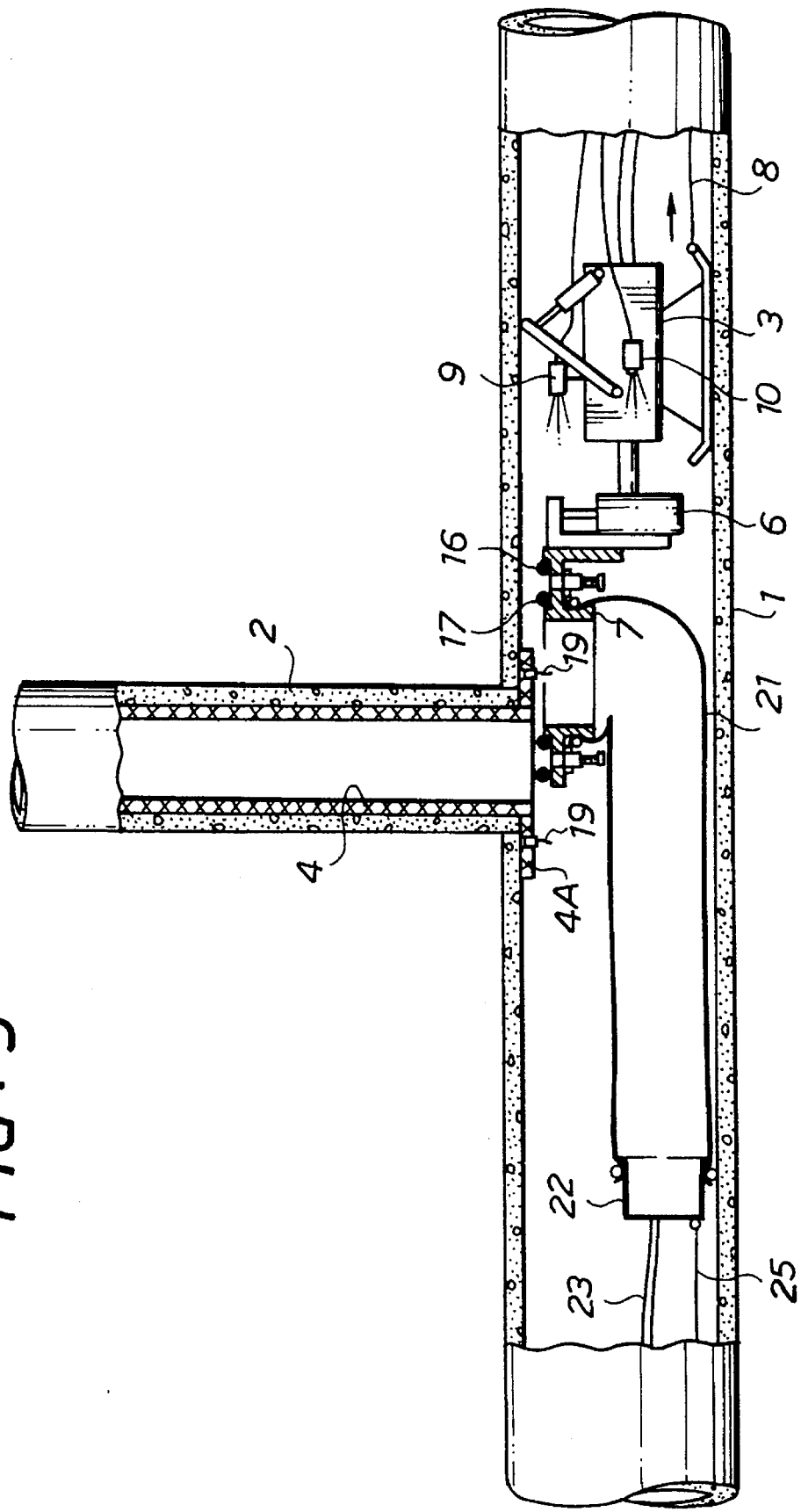
FIG. 3 is a sectional side view of the branched main pipe, illustrating a further step of the branch pipe lining method of the invention.
Figure 4:
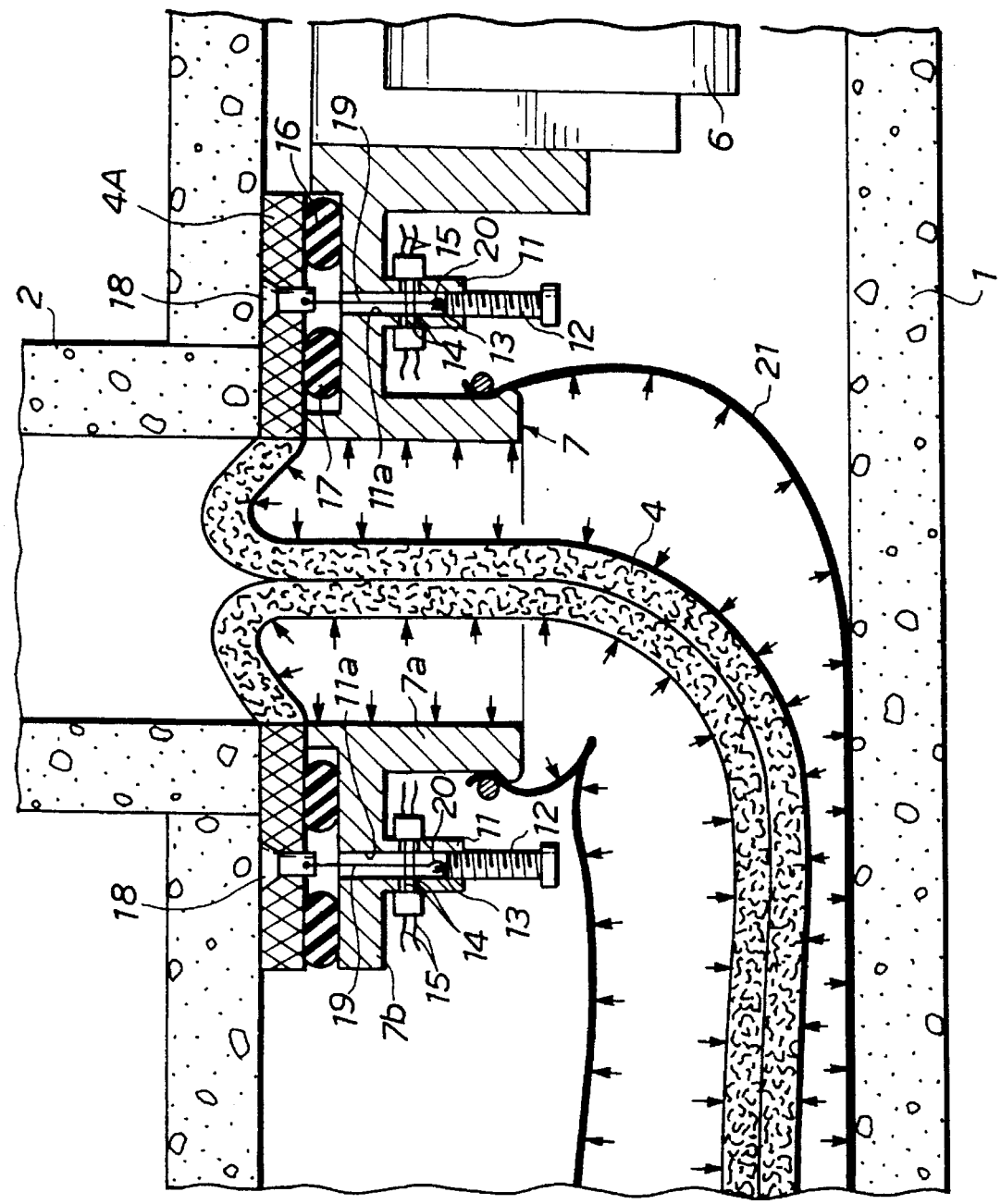
FIG. 4 is is an enlarged view of the portion A of FIG. 1.
Figure 5:
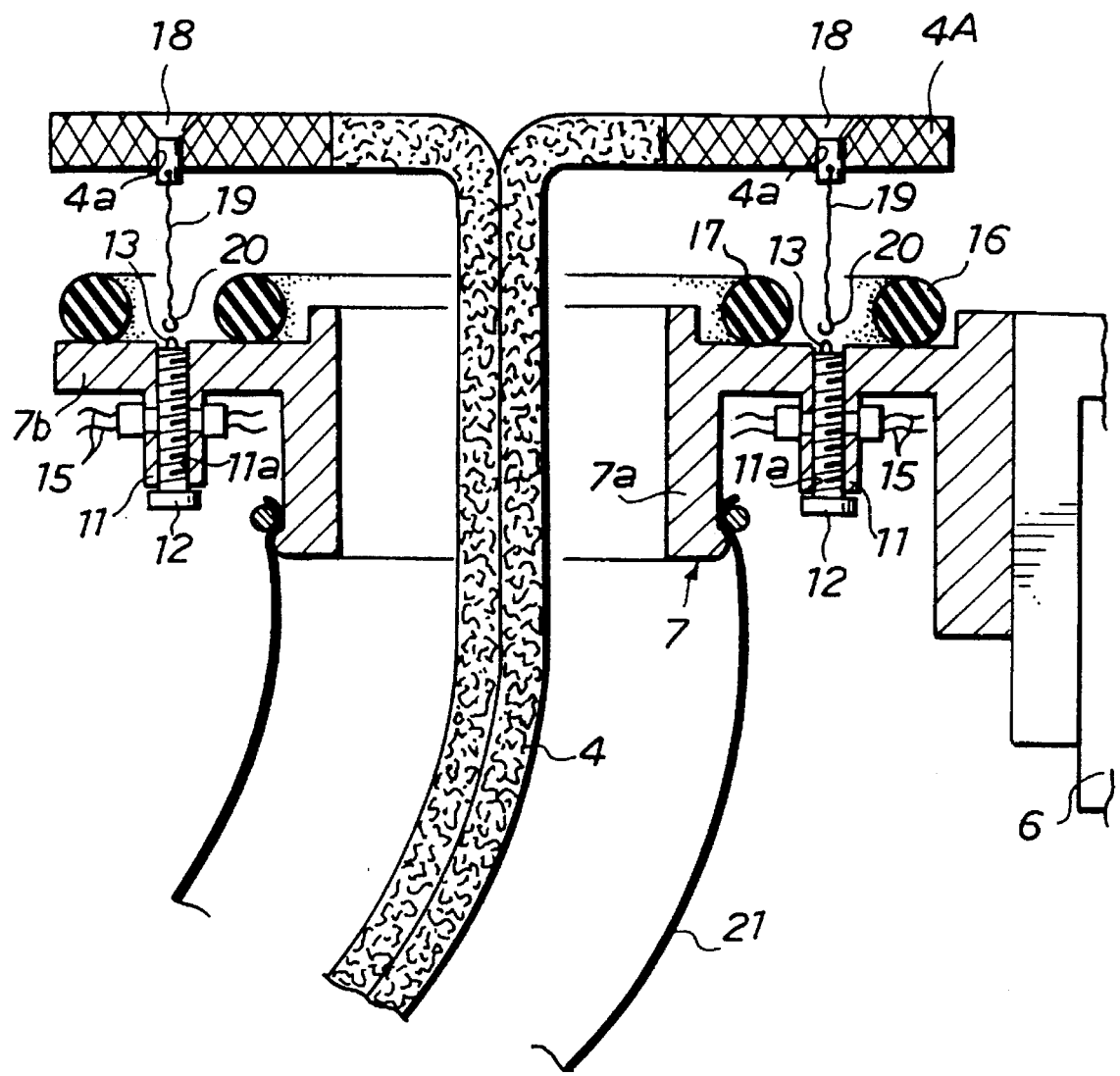
FIG. 5 is sectional side view to show how the branch pipe liner bag and the fluid pressure sealing nozzle are positioned before sealing is effected.
Figure 6:
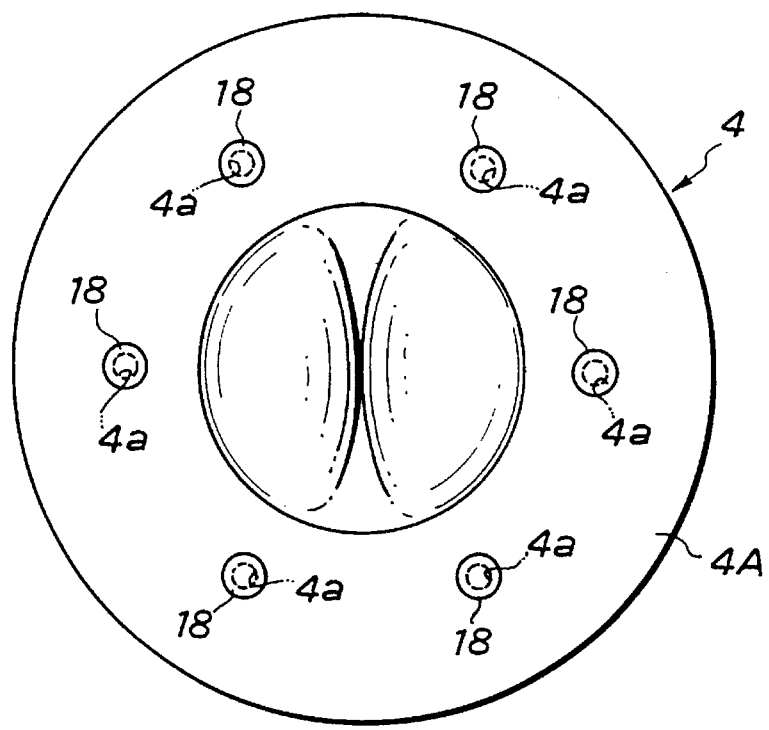
FIG. 6 is a top plan view of the branch pipe liner bag.
Figure 7:
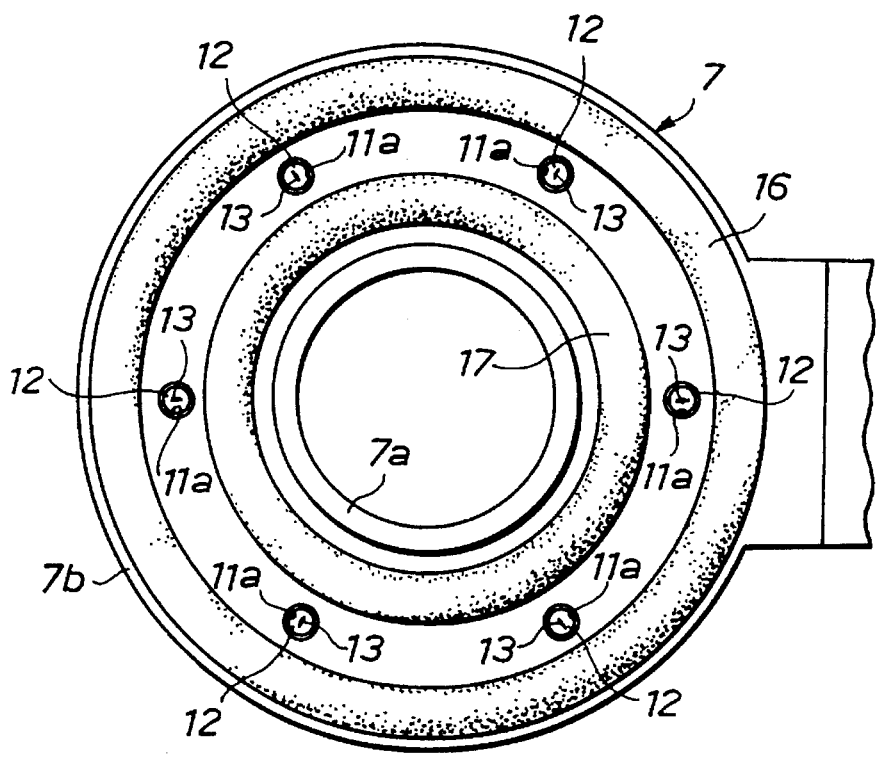
FIG. 7 is a top plan view of the fluid pressure sealing nozzle.
Figure 8:
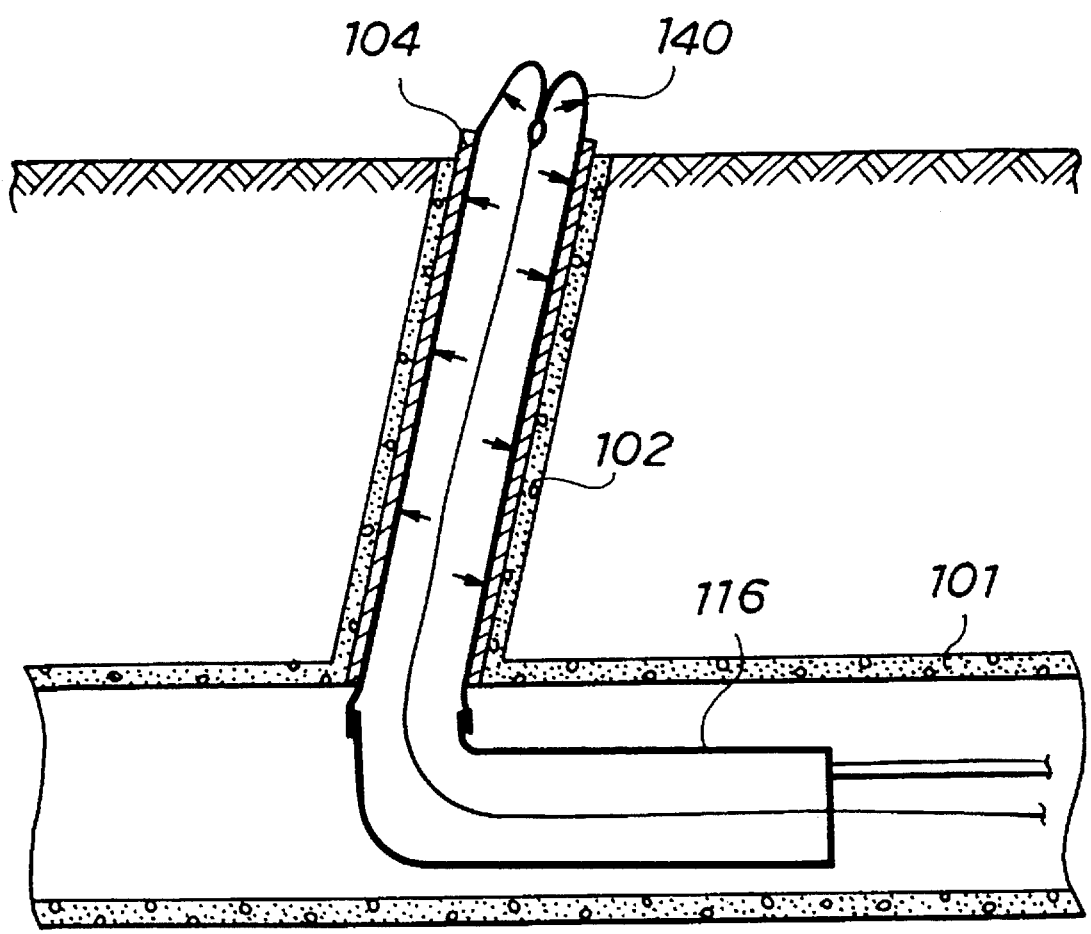
FIG. 8 is a sectional side view of a sewerage site, showing a conventional method of lining a branch pipe.
Figure 9:
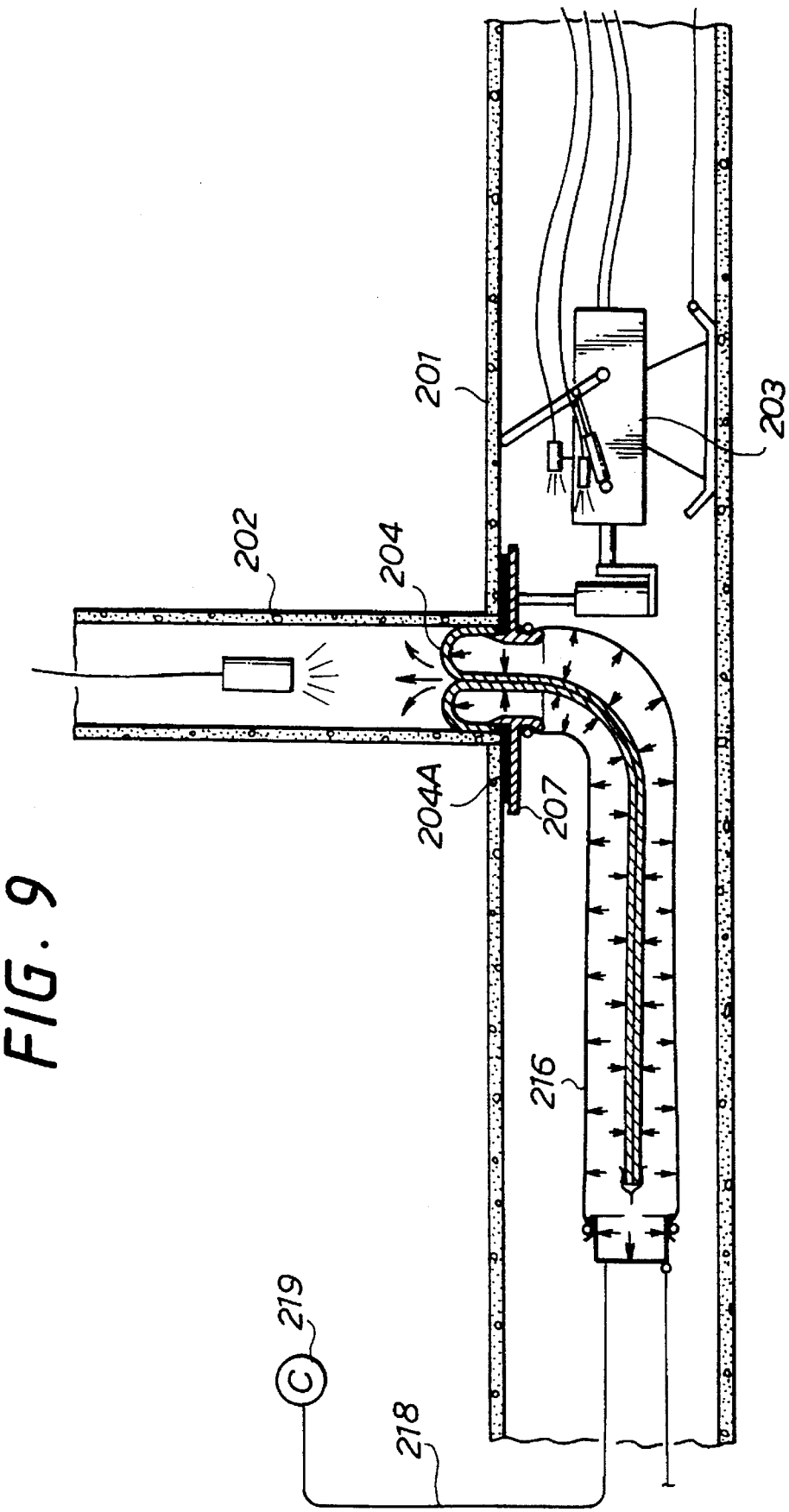
FIG. 9 is a sectional side view of a branched main pipe, showing a step of a conventional method of lining a branch pipe.
Figure 10:
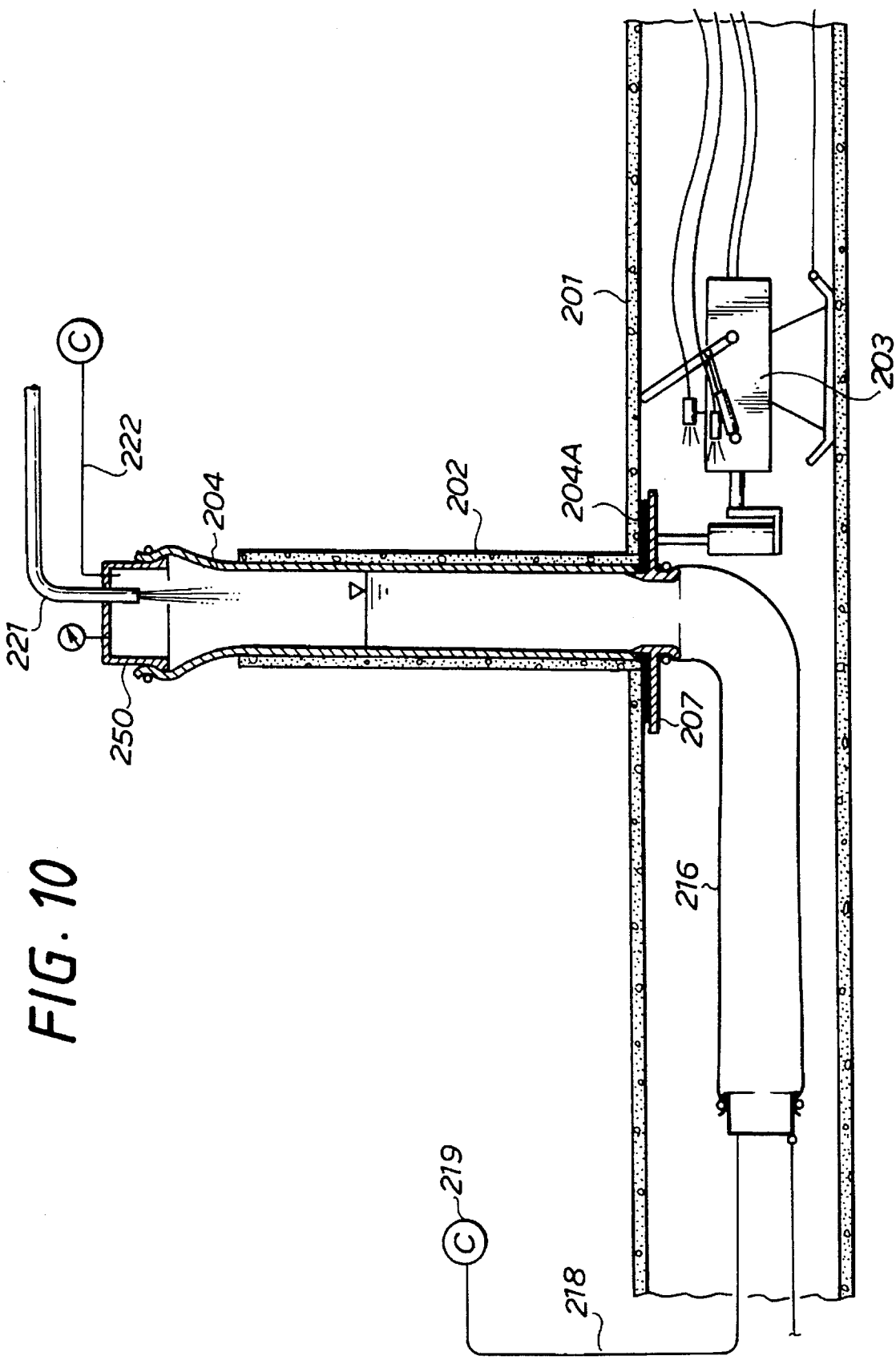
FIG. 10 is a sectional side view of the branched main pipe, showing another step of the conventional method of lining a branch pipe.
Figure 11:
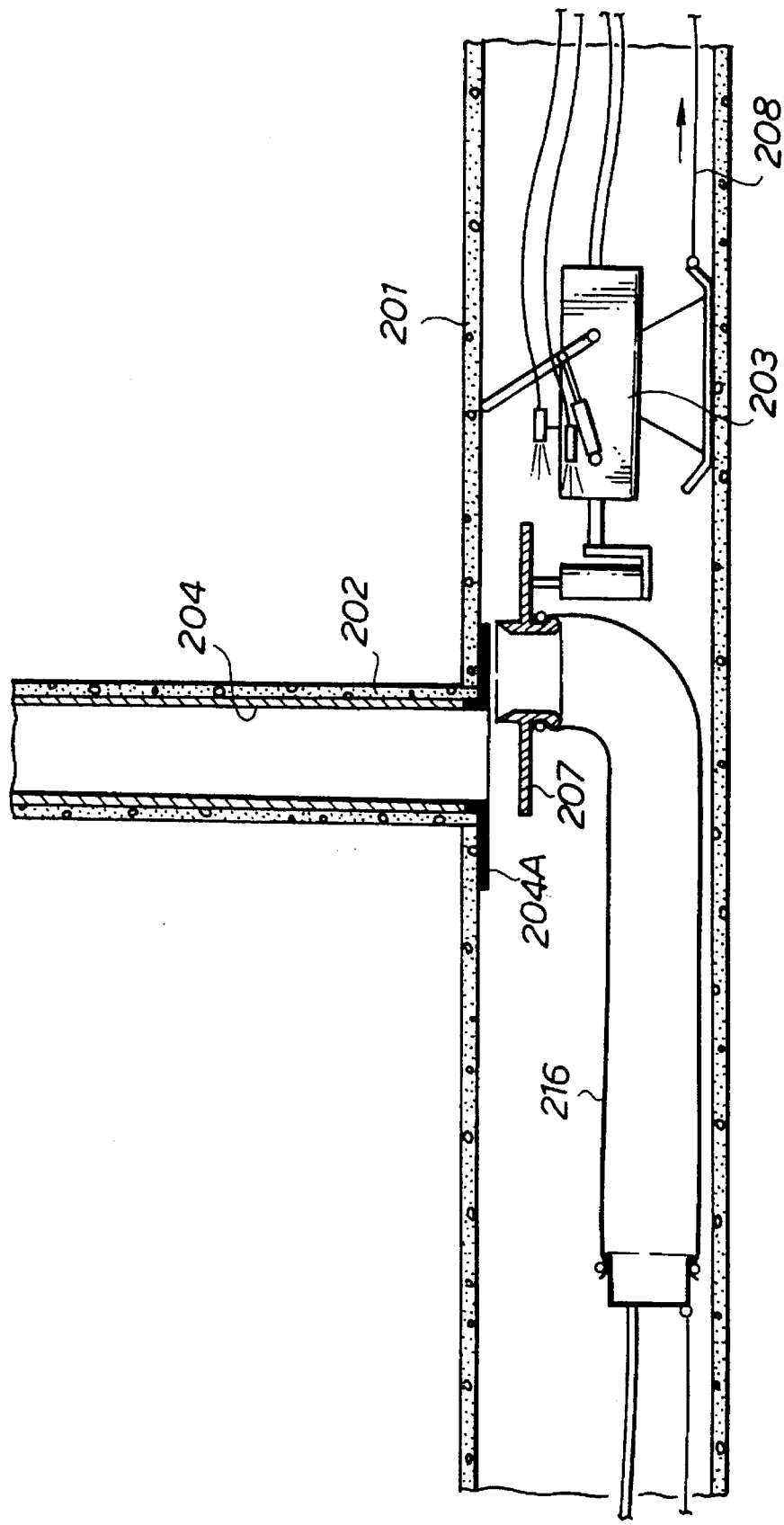
FIG. 11 is a sectional side view of the branched main pipe, showing still another step of the conventional method of lining a branch pipe.
Figure 12A:
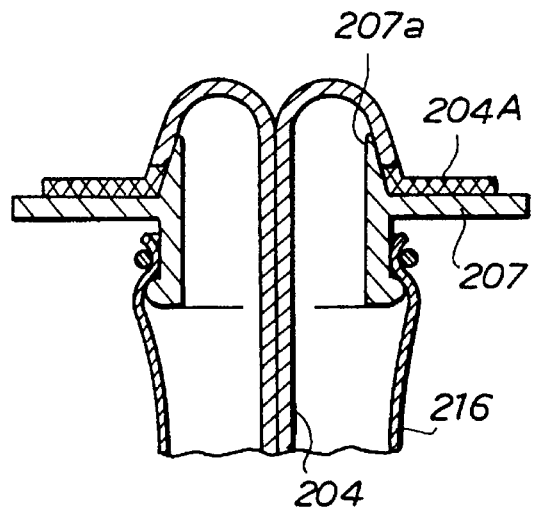
FIGS. 12A–12D contain sectional side views showing four conventional examples of mechanism to seal the junction between the fluid pressure sealing nozzle and the branch pipe liner bag.
Figure 12B:
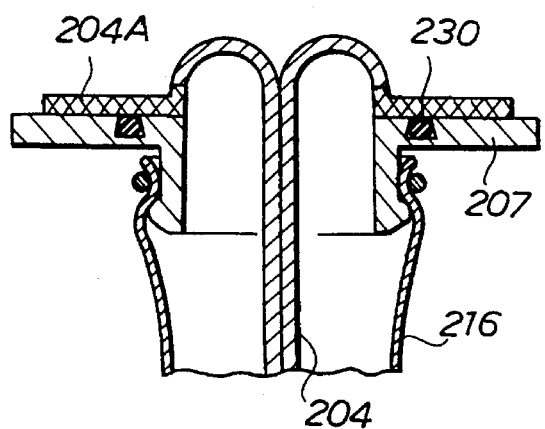
Figure 12C:
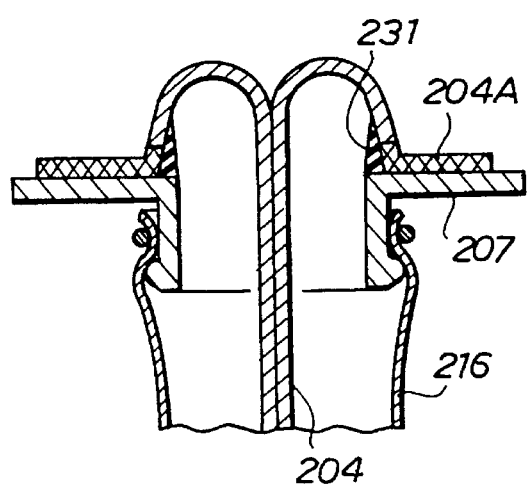
Figure 12D:
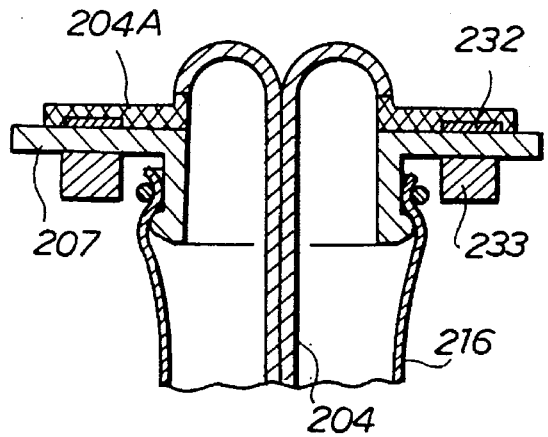

FIGS. 1 through 3 are sectional side views of a branched main pipe, illustrating steps of the branch pipe lining method of the present invention; FIG. 4 is an enlarged view of the portion A of FIG. 1; FIG. 5 is sectional side view to show how the branch pipe liner bag and the fluid pressure sealing nozzle are positioned before sealing is effected; FIG. 6 is a top plan view of the branch pipe liner bag as of the time of FIG. 5; and FIG. 7 is a top plan view of the fluid pressure sealing nozzle as of the time of FIG. 5.

In FIG. 1, the reference numeral 1 designates an underground sewer main pipe, and the reference numeral 2 designates a branch pipe which is narrower than and branched off the main pipe 1. An on-the-sleigh robot 3, an everter 21 with a branch pipe liner bag 4 in it, and other elements are set inside the main pipe 1. A TV camera 5 for monitoring is suspended from above inside the branch pipe 2.

The on-the-sleigh robot 3 is equipped with a hydraulically-operated piston cylinder 6, which is driven to reciprocate its piston rod vertically to push the fluid pressure sealing nozzle 7 up and down, the nozzle 7 being connected to the piston rod. The piston cylinder 6 is also adapted to turn together with the spin shaft by which it is connected to the main body of the robot 3. The on-the-sleigh robot 3 is tied with a pull rope 8 to a rope winder not shown. Thus, by operating the robot 3 it is possible to bring the fluid pressure sealing nozzle 7 to the optimum position. A TV camera 9 is fitted on top of the main body of the robot 3, and a illumination light 10 is attached to either side of the main body of the robot 3.

Now, with reference to FIG. 5, we will explain how the branch pipe liner bag 4 and the fluid pressure sealing nozzle 7 are positioned before sealing is effected. The lower side of the flange 7b, which spreads horizontally from the cylindrical part 7a of the fluid pressure sealing nozzle 7, is formed with six sleeves 11 arranged equidistantly from the center line of the cylindrical part 7a and at regular intervals. A screw-threaded hole 11a is made to penetrate through each sleeve 11 and the flange 7b (ref. FIG. 7). A bolt 12 is screwed into each hole 11a from the lower end of the respective sleeve 11, and n a catch 13 is attached to the upper end of each bolt 12 in a manner such that the catch is freely rotatable.

As shown in FIG. 4, each sleeve 11 is provided with two electric heaters 14, which are connected to power source, not shown, via respective electric cords 15. Incidentally, one of the two electric heaters 14 is a stand-by heater.

A large packing ring 16 and a small packing ring 17 are pasted on the upper face of the flange 7b of the fluid pressure sealing nozzle 7 in a manner such that they are concentric and the screw-threaded holes 11a come between them, as shown in FIG. 7.

Before explaining how the branch pipe 2 is lined with the branch pipe liner bag 4, we will first explain about the branch pipe liner bag 4 itself. A rectangular nonwoven resin-absorbent fabric of polyester felt is sewed into a tubular shape. The tubular fabric is then externally coated with an air- and water-tight plastic film and is soaked with a liquid thermosetting resin. One end of the tubular fabric is closed by sewing, and the other end is turned and partly cured to form a collar 4A, as shown. The other part of the branch pipe liner bag 4 (that part which contains uncured thermosetting resin), which is not the collar 4A, is passed through the cylindrical part 7a of the fluid pressure sealing nozzle 7 and extends downward to be packed inside the everter 21, as shown. Since the thermosetting resin impregnated in the collar 4A of the branch pipe liner bag 4 is cured before setting the liner bag 4, the collar 4A can maintain the its rigid form (curled to fit that part of the inner wall of the main pipe 1 where the branch pipe 2 opens into the main pipe 1). Also, the material of the nonwoven fabric of which the branch pipe liner bag 4 is made may be polyester, nylon, vinylon, or acrylic resin. The thermosetting resin to be impregnated in the liner 4 may be unsaturated polyester resin, epoxy resin or the like.

Now, as shown in FIGS. 5 and 6, partly tapered holes 4a are made through the collar 4A of the branch pipe liner bag 4 at locations which coincide the screw-threaded holes 11a of the fluid pressure sealing nozzle 7. Thus, there are six holes 4a and in each of them a stopper tack 18 is inserted from above. A nylon string 19 is tied to the bottom portion of the stopper tack 18 which protrudes from the collar 4A, and the lower end of this nylon string 19 is tied to a hook 20.

Before the branch pipe liner bag 4 is set to the fluid pressure sealing nozzle 7, the bolts 12 are screwed up in the respective threaded holes 11a so that the upper ends of the bolts 12 come in the vicinity of the upper ends of the threaded holes 11a.

Next, the nylon strings 19 suspended from the collar 4a of the branch pipe liner bag 4 are connected to the bolts 12 by engaging the hooks 20 with the respective catches 13.

Then, each bolt 12 is unscrewed in the threaded hole 11a, and as the nylon strings 19 are pulled down by the bolts 12, the nylon strings 19 pull the collar 4A of the branch pipe liner bag 4 until eventually the collar 4A of the branch pipe liner bag 4 is pressed on the packing rings 16, 17, which are thus squeezed between the collar 4A and the flange 7b, as shown in FIG. 4. Consequently, the collar 4A of the branch pipe liner bag 4 is hermetically anchored on the fluid pressure sealing nozzle 7 with the packing rings 16, 17 interposed between them. Incidentally, when the bolt 12 is screwed or unscrewed, the nylon string 19 will not be twisted by virtue of the freely rotatable catch 13 provided at the end of the bolt 12.

This setting of the branch pipe liner bag 4 to the fluid pressure sealing nozzle 7 is done on the ground, and when it is completed, the branch pipe liner bag 4 packed in the everter 21 and anchored to the fluid pressure sealing nozzle 7 is drawn inside the main pipe 1 together with the on-the-sleigh robot 3, as shown in FIG. 1. Incidentally, one end of the everter 21 is fixed on the outer wall of the lower end of the cylindrical part 7a of the fluid pressure sealing nozzle 7, and the uneverted portion of the branch pipe liner bag 4 is contained in the cylindrical part 7a of the fluid pressure sealing nozzle 7 and the everter 21.

The other end of the everter 21 is closed by a cup 22, and a compressor 24 is connected to the interior of the everter 21 by way of an air hose 23. Incidentally, in FIG. 1, the reference numeral 25 designates a pull rope tied to the cup 22.

Next, with reference to FIGS. 1 through 3, we will describe the branch pipe lining method according to the invention.

As described above, when the on-the-sleigh robot 3 and the everter 21 together with other things are introduced in the main pipe 1, it is possible to move in one body the on-the-sleigh robot 3, the branch pipe liner bag 4 and the everter 21, which are supported by the robot 3, along the main pipe 1 by pulling the pull ropes 8 and 25. Then, by monitoring the interior of the branch pipe 2 and the main pipe 1 by means of the TV cameras 5 and 9, the collar 4A of the branch pipe liner bag 4 is brought to the position right below the opening of the branch pipe 2, and by causing the piston rod of the robot 3 to push up the collar 4A of the branch pipe liner bag 4 is pressed against the inner wall of the main pipe 1 at the opening of the branch pipe 2.

Next, the compressor 24 is driven to supply compressed air to the everter 21 by way of the air hose 23; then the branch pipe liner bag 4 is inflated by the compressed air and everted to proceed in the branch pipe 2 from the main pipe 1 to the ground surface (upward). On this occasion, since high sealing effect is secured at the joint between the branch pipe liner bag 4 and the fluid pressure sealing nozzle 7, as described above, leakage of the compressed air through the joint is prevented, so that the insertion of the branch pipe liner bag 4 into the branch pipe 2 by eversion is conducted smoothly by means of the compressed air.

Thus, when the entire length of the branch pipe liner bag 4 is inserted by eversion into the branch pipe 2, a metallic hot water pipe 26 and a metallic air pipe 27 are stabbed in an upper portion of the everted branch pipe liner bag 4. In a case where the branch pipe liner bag 4 is everted into an access space 2a of the branch pipe 2, as shown in FIG. 2, a rigid elbow liner guide 28 is situated so as to divert the everting branch pipe liner bag 4 into the access space 2a. Holes having diameters equal to the outer diameters of the hot water pipe 26 and the air pipe 27 are made through the elbow liner guide 28 before use, and the hot water pipe 26 and the air pipe 27 are stabbed into an upper portion of the everted branch pipe liner bag 4 past these holes.

Now, the hot water pipe 26 is connected to a lower part of a hot water tank 29 installed on the ground, as shown, and a flow rate controller valve 30 and a hot water pump 31 are provided across the hot water pipe 26. A hot water pipe 32 leading out from a lower portion of the hot water tank 29 is disposed to open over the hot water tank 29, and a hot water pump 33 and a boiler 34 are provided across the hot water pipe 32.

The air pipe 27 is connected to a compressor 35, and an air purge valve 36, a valve 37 to control the pressure and flow rate, and a pressure gauge 38 are provided across the air pipe 27.

When everything is set in a manner as shown in FIG. 2, the compressor 35 is driven the supply compressed air to the branch pipe liner bag 4 by way of the air pipe 27, and also the hot water pump 31 is driven to supply hot water to the branch pipe liner bag 4 via the hot water pipe 26, and as the result the branch pipe liner bag 4 is inflated by the pressure of the compressed air and pressed against the inner wall of the branch pipe 2, as shown in FIG. 2, and at the same time the the branch pipe liner bag 4 is heated by the hot water so that the thermosetting resin impregnated in it is cured by the heat.

So, the branch pipe liner bag 4 becomes rigid while it is stretched and pressed on the inner wall of the branch pipe 2, and as the result the branch pipe 2 is internally lined closely with the rigid branch pipe liner bag 4, and thus repaired.

Incidentally, at the hot water tank 29, before the hot water pump 31 is started to supply hot water to the branch pipe liner bag 4, the water in the tank 29 has been already heated by means of the boiler 34. More particularly, the water in the hot water tank 29 is sent to the boiler 34 by the hot water pump 33 and is heated to a predetermined temperature by the boiler 34 and then returned to the hot water tank 29.

When the curing operation is completed and the branch pipe 2 is lined with the branch pipe liner bag 4, all amount of hot water is removed, and the compressed air is released from the air hose 23. Then, electricity is supplied to the electric heaters 14 from the electric source, not shown, by way of the electric codes 15 so that the electric heaters 14 are electrified to emit heat, which melts and severs the nylon strings 19; as the result, the close junction between the collar 4A of the branch pipe liner bag 4 and the fluid pressure sealing nozzle 7 is disengaged with ease.

Thereafter, as shown in FIG. 3, the on-the-sleigh robot 3 is driven to pull down its piston rod whereby the fluid pressure sealing nozzle 7 supported by the piston rod is lowered too and is thereby easily detached from the collar 4A of the branch pipe liner bag 4. Then, the pull rope 8 is drawn rightward as seen in FIG. 3 to move the on-the-sleigh robot 3 rightward in the main pipe 1 until the fluid pressure sealing nozzle 7 and the everter 21 are all removed from the main pipe 1. Now, only the hardened branch pipe liner bag 4 is left in the branch pipe 2. When hot water pipe 26 and the air pipe 27 are removed, the unnecessary portion of the hardened branch pipe liner bag 4 is cut off and removed from the access space 2a. Thus, a series of the lining operation on the branch pipe 2 is completed.

Incidentally, in this embodiment, the electric heaters 14 are employed as the means to sever the nylon string 19, but it is possible to use a remote-controlled cutter for this purpose. As described above, according to this embodiment, the metallic hot water pipe 26 and the metallic air pipe 27 are stabbed into the upper portion of the branch pipe liner bag 4 prior to the curing operation, and through these pipes 26 and 27 hot water and compressed air are supplied to the everted branch pipe liner bag 4, respectively, so that, unlike the conventional method, it is not necessary to evert the branch pipe liner bag 4 until it reaches the surface of the ground where the pressure cup is attached to the upper end of the everted branch pipe liner bag 4; as the result, the operation is simplified, and since only a little of branch pipe liner bag 4 is wasted, the material cost as well as operations cost is substantially reduced.

While the invention has been described in its preferred embodiment, it is to be understood that modifications will occur to those skilled in the art without departing from the spirit of the invention. For instance, the thermosetting resin may be replaced by another hardenable resin such as photosetting resin. The scope of the invention is therefore to be determined solely by the appended claims.

What is claimed is:

1. A method for lining a branch pipe of an underground main pipe comprising the steps of: (a) preparing a tubular liner bag made of a nonwoven fabric soaked with a hardenable liquid resin, one end of said tubular liner bag being closed; (b) turning outwardly the open end of said tubular liner bag to form a collar which is so curled as to have a curvature equal to that of the inner wall of the main pipe; (c) curing the liquid resin in said collar to thereby harden the collar; (d) embedding stopper tacks in said collar at appropriate locations, each of said stopper tacks having its bottom end exposed from the back face of said collar and connected with a string; (e) facing the back face of the collar of the branch pipe liner bag with the upper face of a flange of a fluid pressure sealing nozzle, which comprises a hollow cylindrical part, through which the liner bag is passed, the flange extending perpendicularly from the side of said cylindrical part, at least one endless sealant laid on the upper face of said flange, and a string pull means provided in said flange; (f) engaging said strings with said string pull means of the flange; (g) causing said string pull means to pull said strings so that the collar and the flange are moved toward each other until sufficient sealing effect is obtained at the juncture between the collar and the flange by means of the endless sealant; (h) packing that portion of said liner bag which is tailing out from the fluid pressure sealing nozzle in an everter, which is a tubular body with one end closed; (i) connecting the open end of said everter with the bottom end of the cylinder part of the fluid pressure sealing nozzle in a manner such a closed space is defined by the inner wall of the everter, the inner wall of said cylindrical part and the outer surface of the uneverted part of the liner bag; (j) positioning said fluid pressure sealing nozzle together with the everter at the opening of the branch pipe in the main pipe such that the collar is fitted on the inner wall of the main pipe around the opening of the branch pipe; (k) everting said branch pipe liner bag into the branch pipe from the fluid pressure sealing nozzle toward the surface of the ground by supplying pressurized fluid into said closed space from the closed end of the everter; (l) hardening said hardenable liquid resin impregnated in the branch pipe liner bag while keeping the liner bag inflated by means of the fluid pressure; (m) severing said strings and detaching the fluid pressure sealing nozzle from the collar of the branch pipe liner bag; and (n) cutting off that portion of said liner bag which protrudes outside the branch pipe.

2. The method as recited in claim 1 wherein at the step (d) said string is each provided with a hook tied at the free end; and at the step (e) said string pull means comprises a plurality of internally threaded sleeves extending perpendicularly downward from the lower face of the flange, the sleeves being arranged at locations which coincide with said stopper tacks of said collar, each one of said sleeves containing a bolt screwed upwardly in it, each one of said screws having a freely rotatable catch means at its tail end; and at the step (f) said hooks are engaged with the respective catches of said bolts; and at the step (g) said bolts are turned in the direction to pull said strings into said sleeves so that the collar and the flange are moved toward each other.

3. The method as recited in claim 2 wherein at the step (e) said fluid pressure sealing nozzle further comprises an electric heater provided at each one of said threaded sleeves, and at the step (m) said strings are severed by being heated by said electric heaters.

4. The method as recited in claim 1 wherein said hardenable liquid resin is a thermosetting resin and at the step (l) said hardening is effected by supplying hot liquid through a pipe which is stabbed into the upper end portion of the everted branch pipe liner bag, and similarly said fluid pressure to keep the liner bag inflated is supplied through another pipe which is also stabbed into the upper end portion of the liner bag.

* * * * *